(12) United States Patent
Goto

(10) Patent No.: US 7,978,299 B2
(45) Date of Patent: Jul. 12, 2011

(54) LIQUID CRYSTAL DEVICE AND METHOD FOR MANUFACTURING THE SAME

(75) Inventor: Tamotsu Goto, Chino (JP)

(73) Assignee: Seiko Epson Corporation (JP)

( * ) Notice: Subject to any disclaimer, the term of this patent is extended or adjusted under 35 U.S.C. 154(b) by 224 days.

(21) Appl. No.: 12/326,939

(22) Filed: Dec. 3, 2008

(65) Prior Publication Data

US 2009/0147207 A1 Jun. 11, 2009

(30) Foreign Application Priority Data

Dec. 10, 2007 (JP) ................................ 2007-317984

(51) Int. Cl.
G02F 1/1339 (2006.01)
(52) U.S. Cl. ........................................ 349/156; 349/155
(58) Field of Classification Search ........... 349/155–156
See application file for complete search history.

(56) References Cited

U.S. PATENT DOCUMENTS

| | | | |
|---|---|---|---|
| 6,583,846 B1 | 6/2003 | Yanagawa et al. | |
| 6,798,486 B2 | 9/2004 | Yanagawa et al. | |
| 7,050,140 B2 | 5/2006 | Yanagawa et al. | |
| 7,167,228 B2 | 1/2007 | Yanagawa et al. | |
| 7,179,512 B2 | 2/2007 | Ebisu et al. | |
| 7,375,776 B2 * | 5/2008 | Yeh et al. | 349/106 |
| 2007/0009677 A1 | 1/2007 | Ebisu et al. | |
| 2007/0040984 A1 | 2/2007 | Ashizawa et al. | |
| 2009/0051864 A1 | 2/2009 | Yanagawa et al. | |

FOREIGN PATENT DOCUMENTS

| | | |
|---|---|---|
| JP | 02-201424 | 8/1990 |
| JP | 2000-035583 | 2/2000 |
| JP | 2000-298282 | 10/2000 |
| JP | 2004-012772 | 1/2004 |
| JP | 2004-287058 | 10/2004 |
| JP | 2005-107494 | 4/2005 |
| JP | 2006-084906 | 3/2006 |
| JP | 2006-085123 | 3/2006 |

* cited by examiner

*Primary Examiner* — David Nelms
*Assistant Examiner* — Phu Vu
(74) *Attorney, Agent, or Firm* — Harness, Dickey & Pierce, P.L.C.

(57) ABSTRACT

A liquid crystal device includes a first substrate, a second substrate, a columnar spacer and liquid crystal. The first substrate and the second substrate are bonded together with the columnar spacer interposed therebetween. The liquid crystal is sandwiched between the first substrate and the second substrate. The columnar spacer has a base portion formed on the first substrate, and a tip portion fixed to the second substrate by using an adhesive material.

7 Claims, 8 Drawing Sheets

LIQUID CRYSTAL DEVICE AND METHOD FOR MANUFACTURING THE SAME

BACKGROUND

1. Technical Field

The present invention relates to a liquid crystal device and a method for manufacturing the same.

2. Related Art

There has been known a liquid crystal device that has a columnar spacer interposed between a first substrate and a second substrate, the first substrate and the second substrate sandwiching a liquid crystal layer.

The liquid crystal device is formed to have an area where the columnar spacer overlaps a contact hole provided in the first substrate and another area where the columnar spacer does not overlap the contact hole in each pixel.

This configuration prevents a columnar spacer from falling to the inside of the contact hole even in the case where displacement occurs between the first substrate and the second substrate attached to each other.

A desired cell gap can thus be surely secured (refer to, e.g., JP-A-2005-107494).

However, one problem with the foregoing liquid crystal device in related art is that when the device is placed in a condition where substrates stand vertically upright, the liquid crystal sandwiched between the substrates moves downward due to the effect of gravity, expanding a portion of a cell gap on the lower side of the liquid crystal device.

This results in a nonuniform cell gap of the liquid crystal device, decreasing the display quality.

SUMMARY

An advantage of the present invention is to provide a liquid crystal device in which a cell gap is uniformly maintained even when the liquid crystal device is placed in a condition where substrates stand vertically upright, enabling the display quality to be improved.

A liquid crystal device according to an aspect of the invention includes a first substrate, a second substrate, a columnar spacer and liquid crystal.

The first substrate and the second substrate are bonded together with the columnar spacer interposed therebetween.

The liquid crystal is sandwiched between the first substrate and the second substrate.

The columnar spacer has a base portion formed on the first substrate and a tip portion fixed to the second substrate by using an adhesive material.

With this configuration, when the liquid crystal device is placed in a condition where the first substrate and the second substrate stand vertically upright, gravity acts on the liquid crystal layer between the first substrate and the second substrate.

This increases the pressure of the liquid crystal layer on the lower side.

Therefore, stresses to expand the gap between the first substrate and the second substrate act on the lower sides of these substrates.

At this point, since the base portion of the columnar spacer is formed on the first substrate and the tip portion is fixed to the second substrate, tensile stresses act on the columnar spacer.

Therefore, the stresses to expand the gap between the first substrate and the second substrate are received as the tensile stresses by the columnar spacer.

This prevents the gap between the first substrate and the second substrate from expanding.

Accordingly, even when the liquid crystal device is placed in a condition where the first substrate and the second substrate stand vertically upright, stresses to expand the gap between the first substrate and the second substrate can be received by the columnar spacer and the adhesive material.

This makes it possible to provide a liquid crystal device in which the cell gap is uniformly maintained, enabling the display quality to be improved.

In the liquid crystal device according to the aspect of the invention, it is preferable that a recessed portion for receiving the adhesive material be formed in the tip portion.

With this configuration, an uncured adhesive material is maintained in the tip portion of the columnar spacer, so that the adhesive material is prevented from flowing to the outside of the tip portion.

This enables the tip portion to be securely fixed to the second substrate.

In the liquid crystal device according to the aspect of the invention, it is preferable that a protruded portion corresponding to the recessed portion be formed on the second substrate, the protruded portion being contained in the recessed portion.

With this configuration, the area of bonding of the second substrate to the tip portion of the columnar spacer can be increased, enabling the tip portion to be securely fixed to the second substrate.

In the liquid crystal device according to the aspect of the invention, it is preferable that a substrate recessed portion for receiving the adhesive material be formed in the second substrate.

With this configuration, an uncured adhesive material is maintained on the second substrate, so that the adhesive material is prevented from flowing to the outside of the recessed portion.

This enables the tip portion of the columnar spacer to be securely fixed to the second substrate.

In the liquid crystal device according to the aspect of the invention, it is preferable that the substrate recessed portion be formed to be suitable for the columnar spacer such that the tip portion is containable in the substrate recessed portion.

With this configuration, the area of bonding of the second substrate to the tip portion of the columnar spacer can be increased, enabling the tip portion to be securely fixed to the second substrate.

A method for manufacturing a liquid crystal device according to another aspect of the invention is a method for manufacturing a liquid crystal device having a first substrate, a second substrate, a columnar spacer, the first substrate and the second substrate being bonded together with the columnar spacer interposed therebetween, and liquid crystal sandwiched between the first substrate and the second substrate.

This method includes a spacer formation step for forming a spacer material layer on the first substrate and processing the spacer material layer to form the columnar spacer, an adhesive material application step for applying an adhesive material to at least one of a tip portion of the columnar spacer and an area of the second substrate on which the tip portion abuts, a liquid crystal application step for applying the liquid crystal onto one of the first substrate and the second substrate, and a substrate bonding step for bonding the first substrate and the second substrate together with the columnar spacer interposed therebetween and fixing the tip portion of the columnar spacer to the second substrate by using the adhesive material.

By manufacturing in this way, the base portion of the columnar spacer is formed on the first substrate and the tip portion is fixed to the second substrate by using the adhesive material.

Accordingly, even when the liquid crystal device is placed in a condition where the first substrate and the second substrate stand vertically upright, stresses to expand the gap between the first substrate and the second substrate can be received by the columnar spacer and the adhesive material.

This makes it possible to provide a liquid crystal device in which the cell gap of a liquid crystal panel is uniformly maintained, enabling the display quality to be improved.

Regarding the method for manufacturing a liquid crystal device according to another aspect of the invention, in the liquid crystal application step, it is preferable that the liquid crystal be applied to enclose an adhesive material application region to which the adhesive material is to be applied, thereby forming a liquid crystal non-application region that includes the adhesive material application region and to which the liquid crystal is not applied.

Manufacturing in this way can prevent the uncured adhesive material from mixing into the liquid crystal.

BRIEF DESCRIPTION OF THE DRAWINGS

The invention will be described with reference to the accompanying drawings, wherein like numbers reference like elements.

FIG. 2A is a plan view of a pixel region and FIG. 2B is a sectional view of the pixel region.

DESCRIPTION OF EXEMPLARY EMBODIMENTS

Figure 1:
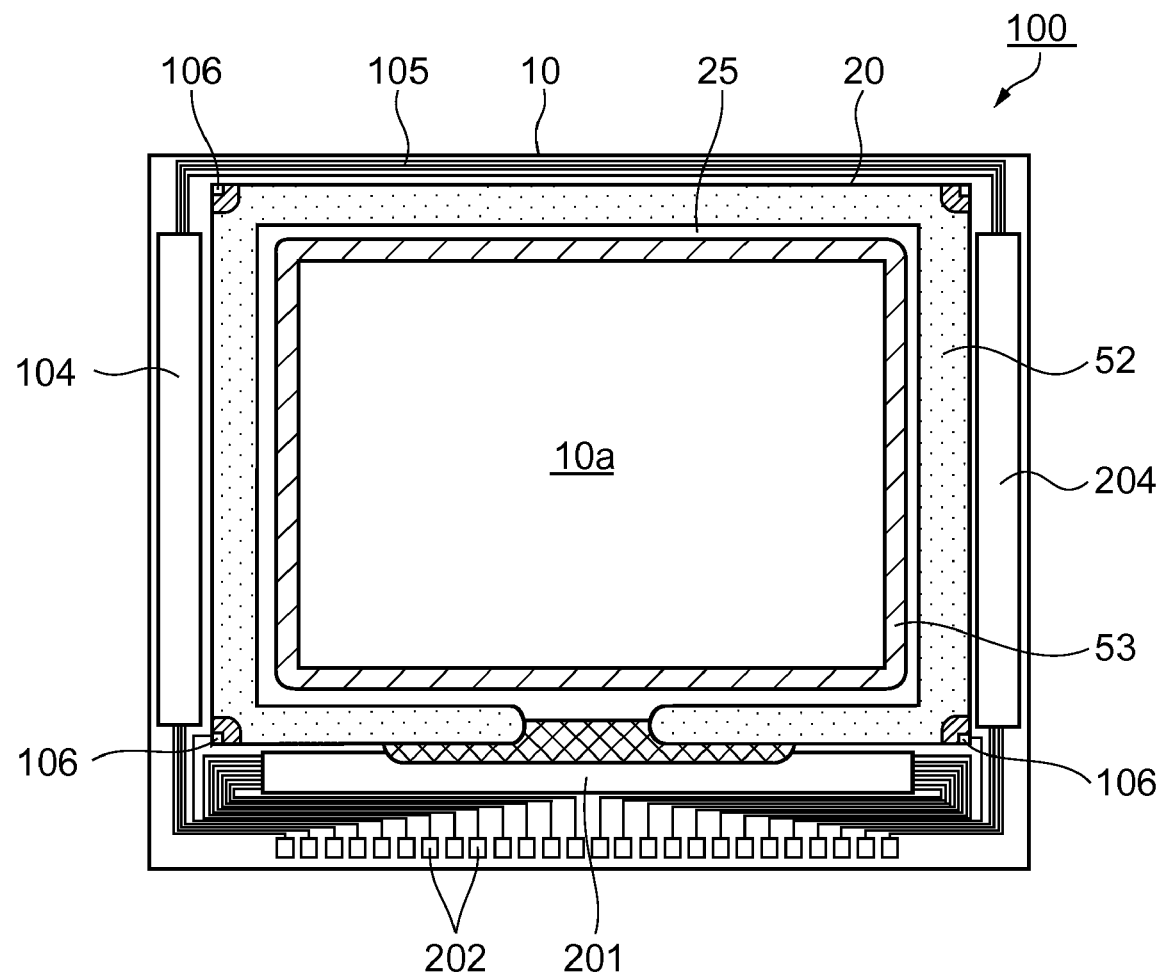
FIG. 1 is a plan view showing the overall configuration of a liquid crystal device in a first embodiment of the invention.

Embodiments of the invention will be described.

First Embodiment

The first embodiment of this invention is next described with reference to the drawings.

Note that the scales of the members in the drawings referred to herein are changed so that each of the members can be adequately recognized.

Liquid Crystal Device

A liquid crystal device 100 of this embodiment is an active-matrix transmission liquid crystal device.

In this liquid crystal device, three subpixels that emit light in red (R), green (G) and blue (B) colors, respectively, constitute one pixel.

As used herein, a display region serving as the minimum unit for constituting the display is referred to as a "subpixel region", and a display region composed of three subpixels as a "pixel region".

As shown in FIG. 1, in the liquid crystal device 100, a thin film transistor (TFT) array substrate (second substrate) 10 and a counter substrate (first substrate) 20 are bonded together with a sealing material 52, which has a substantially rectangular frame shape in plan view, interposed therebetween, and a liquid crystal layer is sealed in an area partitioned by the sealing material 52.

In an area inside the sealing material 52, a light-shielding film (periphery partition portion) 53 made of a light-shielding material is formed in a rectangular frame shape.

The area inside the light-shielding film 53 constitutes an image display region 10a of the liquid crystal device 100.

In a peripheral circuit area outside the sealing material 52, a data-line drive circuit 201 and external circuit mounting terminals 202 are arranged along one side of a TFT array substrate 10.

Scanning-line drive circuits 104 are provided along two sides adjacent to this one side.

Formed along the remaining one side of the TFT array substrate 10 are a plurality of wires 105 that establish connection between the scanning-line drive circuits 104 provided on both sides of the image display region 10a.

An inter-substrate conductive material 106 for establishing electrical connection between the TFT array substrate 10 and the counter substrate 20 is arranged at corners of the counter substrate 20.

Figure 2A:
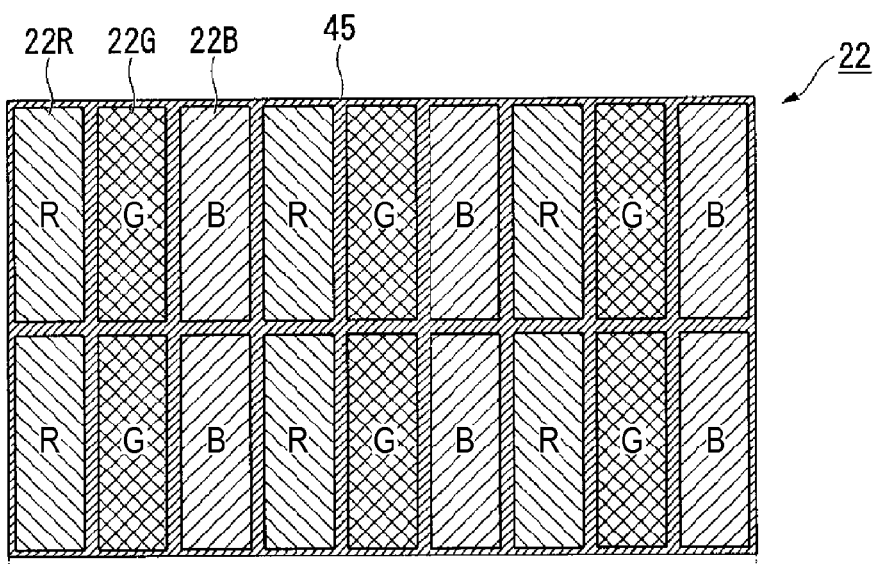
FIGS. 2A and 2B are enlarged views of the liquid crystal device in the first embodiment of the invention.

FIG. 2A is an enlarged plan view of the image display region 10a.

As shown in FIG. 2A, the liquid crystal device 100 includes light-shielding portions 45 extending substantially in a grid pattern in plan view and a plurality of colored portions 22R, 22G and 22B each having a rectangular shape in plan view.

The colored portions 22R, 22G and 22B are formed in spaces between the light-shielding portions 45.

A color filter layer 22 is composed of these light-shielding portions 45 and the colored portions 22R, 22G and 22B.

Columnar spacers 181 each having a circle shape in plan view are arranged corresponding to intersections of the light-shielding portions 45.

Figure 2B:
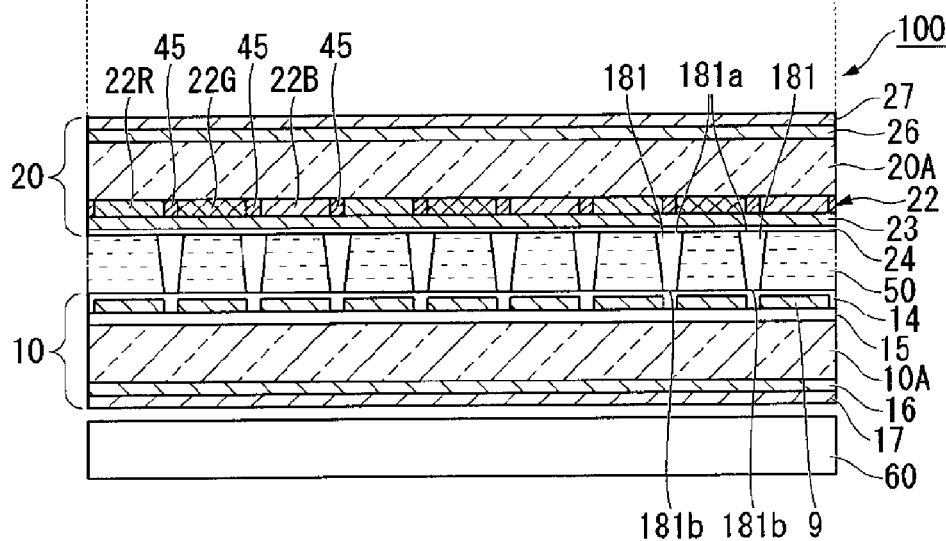

As shown in FIG. 2B, in the liquid crystal device 100, the TFT array substrate 10 and the counter substrate 20 are bonded together with the columnar spacers 181 interposed therebetween, and a liquid crystal layer 50 is sandwiched between the TFT array substrate 10 and the counter substrate 20.

A base portion 181a of the columnar spacer 181 is formed on the counter substrate 20 and a tip portion 181b is fixed to the TFT array substrate 10 by using an adhesive material.

A backlight (illuminating means) 60 having a light source, a reflector and a light guiding plate is arranged on the outer side (the side opposite to that of the liquid crystal layer 50) of the TFT array substrate 10.

The TFT array substrate 10 includes a substrate body 10A made of a translucent material, such as quartz or glass, as its base.

On the inner side (the side of the liquid crystal layer 50) of the substrate body 10A, an interlayer insulating layer 15 and pixel electrodes 9 made of a translucent conductive material, such as indium tin oxide (ITO), are formed, and an alignment layer 14 is formed to cover the pixel electrodes 9.

TFTs, data lines, scanning lines, capacitor lines and the like (omitted in FIG. 2B), which will be described later, are formed in the interlayer insulating layer 15.

On the outer side of the substrate body 10A, a phase difference plate 16 and a polarizing plate 17 are stacked sequentially from the side of the substrate body 10A.

The counter substrate 20, which is a color filter substrate, includes a substrate body 20A made of a translucent material, such as quartz or glass, as its base.

On the inner side of the substrate body 20A, the color filter layer 22, a common electrode 23 made of a translucent conductive material, and an alignment layer 24 are sequentially stacked.

On the outer side of the substrate body 20A, a phase difference plate 26 and a polarizing plate 27 are stacked sequentially from the side of substrate body 20A.

The polarizing plate 17 and 27 have a function to allow only linearly polarized light vibrating in a specific direction to be transmitted.

The phase difference plates 16 and 26 are provided as a need arises.

For example, a λ/4 phase difference plate having a phase difference of a substantially quarter wavelength with respect to a wavelength of visible light and a phase difference plate having a function of compensation of the viewing angle are used.

Figure 3:
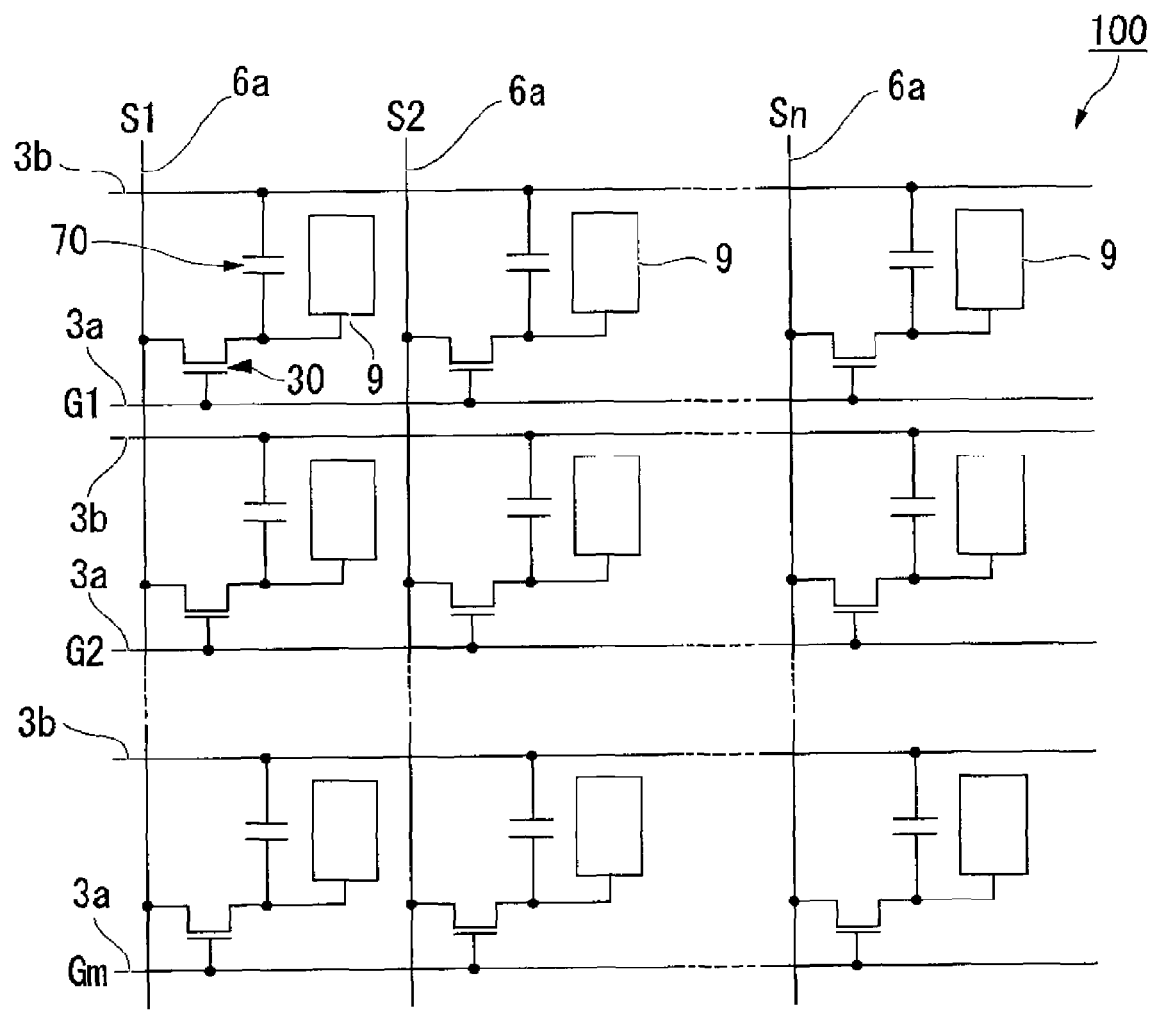
FIG. 3 is an equivalent circuit diagram of the liquid crystal device in the first embodiment of the invention.

FIG. 3 is an equivalent circuit diagram of the liquid crystal device 100.

In the liquid crystal device 100 of this embodiment, the pixel electrode 9 and a TFT 30, which is a switching element for controlling the pixel electrode 9, are formed in a plurality of subpixel regions that are arranged in a matrix and that constitute the image display region 10a.

The data line 6a to which image signals are supplied is electrically connected to the source of the TFT 30.

Image signals S1, S2, . . . , Sn to be written to the data line 6a are supplied in this order in a line sequential manner, or are supplied to a plurality of data lines 6a adjacent to one another on a group-to-group basis.

The scanning line 3a is electrically connected to the gate of the TFT 30, and scanning signals G1, G2, . . . , Gm are applied as pulses at a predetermined timing in a line sequential manner to a plurality of scanning lines 3a.

The pixel electrode 9 is electrically connected to the drain of the TFT 30.

The TFT 30 serving as a switching element is turned on for a certain period to write the image signals S1, S2, . . . , Sn supplied from the data line 6a at a predetermined timing.

The image signals S1, S2, . . . , Sn at a predetermined level that have been written through the pixel electrode 9 to the liquid crystal are retained for a certain period between the pixel electrode 9 and a common electrode to be described later.

In liquid crystal, the alignment and the order of sets of molecules change according to levels of applied voltage, modulating light and enabling gray-scale display.

Here, in order to prevent the retained image signals from leaking, a storage capacitor 70 is added in parallel to a liquid crystal capacitor formed between the pixel electrode 9 and the common electrode 23.

Note that reference numeral 3b denotes a capacitor line.

Figure 4:
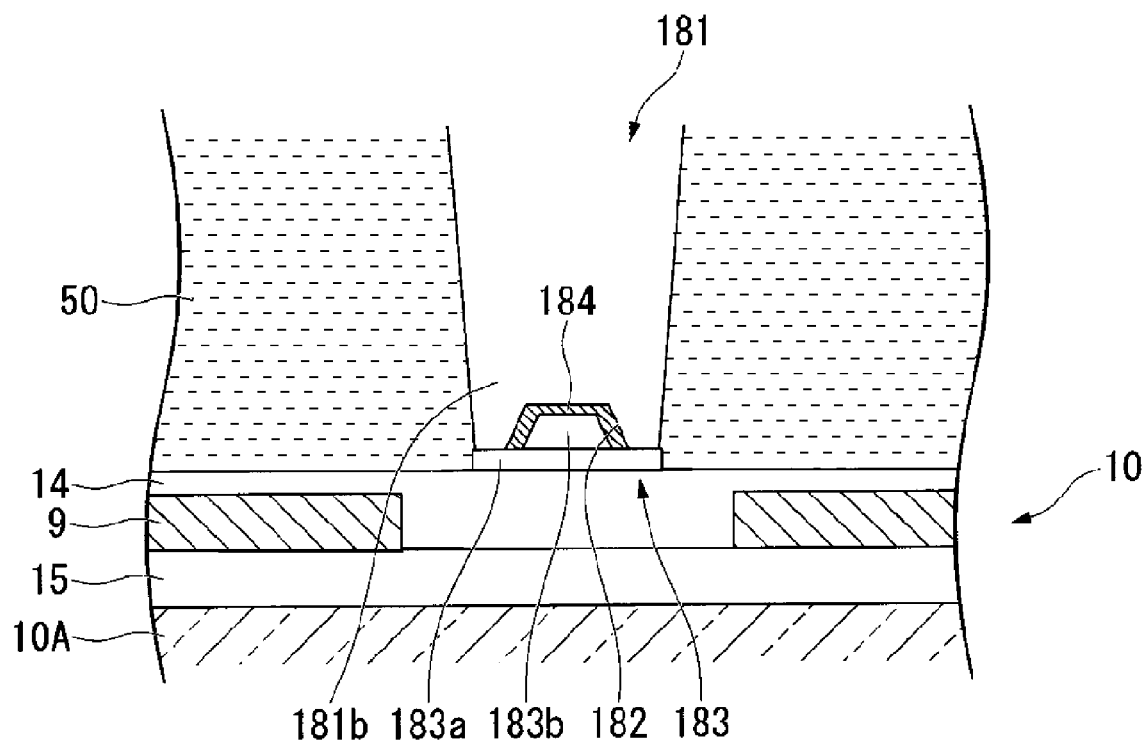
FIG. 4 is a partially enlarged view of FIG. 3.

In this embodiment, as shown in FIG. 4, a recessed portion 182 is formed in a tip portion 181b of the columnar spacer 181.

The recessed portion 182 is formed on an edge surface facing the TFT array substrate 10 of the columnar spacer 181, and its planar shape is formed in the same fashion as that of the tip portion 181b of the columnar spacer 181.

The inside of the recessed portion 182 is filled with an adhesive material 184.

As the adhesive material 184, for example, thermosetting resin is used.

On the other hand, a protruded portion 183 corresponding to the recessed portion 182 is formed on the alignment layer 14, the outermost surface of the TFT array substrate 10.

The protruded portion 183 is formed in an area on the TFT array substrate 10 on which the tip portion 181b of the columnar spacer 181 abuts in a condition where the TFT array substrate 10 and the counter substrate 20 are made to face each other and are aligned.

The protruded portion 183 has a flat edge portion 183a abutting on the tip portion 181b of the columnar spacer 181, and a projecting portion 183b formed in the center portion of the flat edge portion 183a.

The projecting portion 183b is formed according to the shape of the recessed portion 182, and is contained in the inside of the recessed portion 182 without being in contact with the inside surface of the recessed portion 182.

As described above, the projecting portion 183b, which is part of the protruded portion 183, is contained in the recessed portion 182 filled with the adhesive material 184, and the edge surface of the tip portion 181b of the columnar spacer 181 abuts on the flat edge portion 183a of the protruded portion 183.

This allows the tip portion 181b of the columnar spacer 181 formed on the counter substrate 20 to be fixed to the protruded portion 183 formed on the TFT array substrate 10 by using the adhesive material 184.

Working effects of the liquid crystal device 100 of this embodiment is next described.

Upon placing of the liquid crystal device 100 shown in FIG. 1, if the device is placed in a state where the image display region 10a stands at right angles to the horizontal direction, the TFT array substrate 10 and the counter substrate 20 shown in FIG. 2B also stand at right angles to the horizontal direction.

As a result, gravity acts on the liquid crystal layer 50, which is sandwiched between the TFT array substrate 10 and the counter substrate 20, along the surface direction of each substrate.

This increases the pressure of the liquid crystal layer 50 on the lower sides of the TFT array substrate 10 and the counter substrate 20.

Therefore, stresses to expand the gap between the TFT array substrate 10 and the counter substrate 20, which sandwich the liquid crystal layer 50, act on these substrates.

Here, in the liquid crystal device 100 of this embodiment, the base portion 181a of the columnar spacer 181 is formed on the counter substrate 20, and the tip portion 181b is fixed to the protruded portion 183 formed on the TFT array substrate 10 with the adhesive material 184 positioned therebetween.

Therefore, when the stresses to expand the gap between the TFT array substrate 10 and the counter substrate 20 act on these substrates, tensile stresses act on the columnar spacers 181.

Receiving of the tensile stresses in the columnar spacers 181 can prevent the gap between the TFT array substrate 10 and the counter substrate 20 from expanding due to the increase in pressure of the liquid crystal layer 50.

In the liquid crystal device 100 of this embodiment, the recessed portion 182 for receiving the adhesive material 184 is formed in the tip portion 181b of the columnar spacer 181.

This allows the uncured adhesive material 184 to be held in the tip portion 181b of the columnar spacer 181 to prevent the adhesive material 184 from flowing out from the edge surface of the tip portion 181b.

Therefore, the tip portion 181b can be securely fixed to the TFT array substrate 10.

In addition, the adhesive material 184 can be prevented from mixing into the liquid crystal layer 50.

Further, in the liquid crystal device 100 of this embodiment, the protruded portion 183 corresponding to the recessed portion 182 of the columnar spacer 181 is formed on the TFT array substrate 10.

This increases the area of bonding of the TFT array substrate 10 to the tip portion 181b of the columnar spacer 181, enabling the bonding strength to be improved.

The tip portion 181b of the columnar spacer 181 can thus be more securely and strongly fixed to the TFT array substrate 10.

Moreover, the projecting portion 183b of the protruded portion 183 is contained in the recessed portion 182.

The amount of the adhesive material 184 to be received in the recessed portion 182 can therefore be decreased.

Thus, consumption of the adhesive material 184 can be reduced, and the adhesive material 184 can be more securely prevented from flowing out from the edge surface of the tip portion 181b of the columnar spacer 181.

As described above, according to the liquid crystal device 100 of this embodiment, upon placing of the liquid crystal device 100, even if the TFT array substrate 10 and the counter substrate 20 stand at right angels to the horizontal direction, stresses to expand the gap between the TFT array substrate 10 and the counter substrate 20 can be received by the columnar spacers 181.

This enables the cell gap of the liquid crystal device 100 to be maintained uniformly, leading to the improved display quality.

Method for Manufacturing Liquid Crystal Device

With reference to FIGS. 5 to 8, a method for manufacturing the liquid crystal device 100 of this embodiment is next be described.

The spacer formation step, the adhesive material application step, the liquid crystal application step and the substrate bonding step are mainly described below, and the other steps are appropriately omitted.

Note that known processes may be employed for the other steps.

Figure 5:
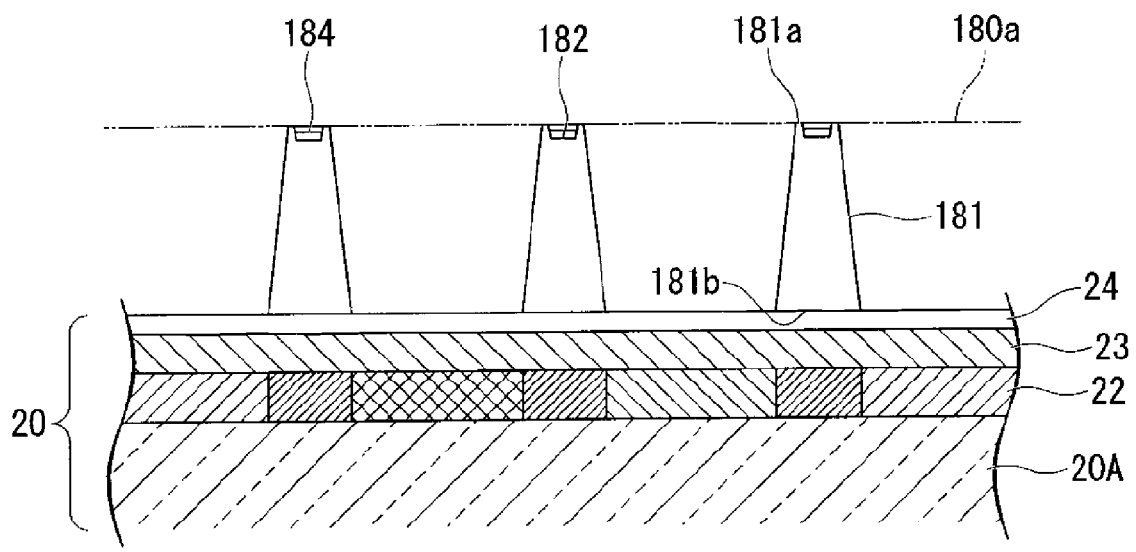
FIG. 5 is a sectional view showing a manufacturing step of the liquid crystal device in the first embodiment of the invention.

As shown in FIG. 5, the counter substrate 20 in which the alignment layer 24, the common electrode 23, the color filter layer 22 and the like are formed is prepared.

Then, a spacer material layer 180a is formed, e.g., of acrylic resin on the counter substrate 20.

Then, the spacer material layer 180a is processed, e.g., by a photolithography method, an etching method and the like to form the columnar spacers 181 on the counter substrate 20 (spacer formation step).

Thus, the base portion 181a of the columnar spacer 181 is formed integrally on the counter substrate 20.

Here, in this embodiment, the recessed portion 182 is formed on an edge surface of the tip portion 181b of the columnar spacer 181.

The recessed portion 182 is formed e.g., by a photolithography method, an etching method and the like.

Next, the adhesive material 184 is discharged and applied as droplets to the recessed portion 182 of the columnar spacer 181 by an inkjet method, so that the recessed portion 182 receives the adhesive material 184 (adhesive material application step).

At this point, to prevent the adhesive material 184 from flowing to the outside of the recessed portion 182, the discharge amount of the adhesive material 184 is controlled and droplets of the adhesive material 184 are discharged and applied onto the inside of the recessed portion 182 with good precision.

Figure 6:
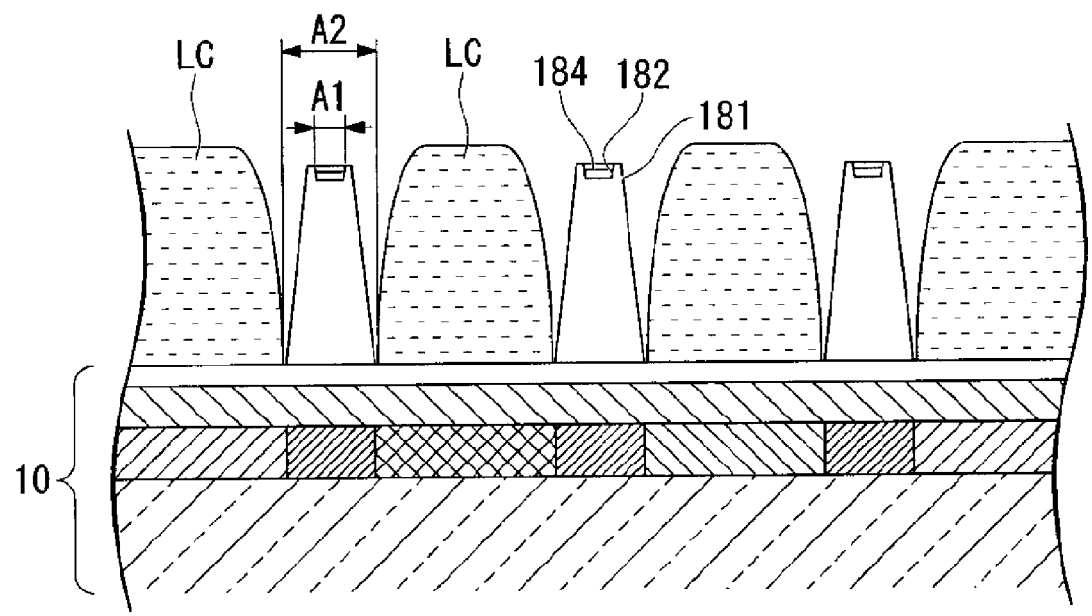
FIG. 6 is a sectional view showing a manufacturing step of the liquid crystal device in the first embodiment of the invention.

Next, after the sealing material 52 (refer to FIG. 1) is applied in a frame shape onto the counter substrate 20, liquid crystal LC is discharged and applied as droplets onto the inside of the sealing material 52, as shown in FIG. 6, e.g., by an inkjet method (liquid crystal application step).

At this point, the liquid crystal LC is applied to enclose an adhesive material application region A1 into which the adhesive material 184 is to be applied, i.e., a region for forming the recessed portion 182 of the columnar spacer 181, thereby forming a liquid crystal non-application region A2 that includes the adhesive material application region A1 and into which droplets of the liquid crystal LC are not applied.

The liquid crystal non-application region A2 is formed e.g., in a circular shape in plan view, according to the planar shape of the columnar spacer 181.

Figure 7:
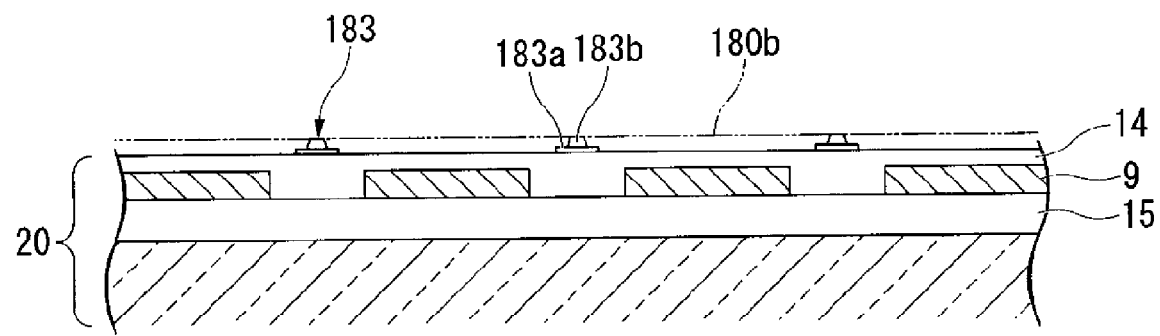
FIG. 7 is a sectional view showing a manufacturing step of the liquid crystal device in the first embodiment of the invention.

As shown in FIG. 7, the TFT array substrate 10 in which the alignment layer 14, the common electrode 23, the pixel electrode 9, the interlayer insulating layer 15 and the like are formed is prepared.

Then, a protruded portion material layer 180b is formed, e.g., of acrylic resin on a surface of the TFT array substrate 10.

Then, the protruded portion material layer 180b is processed, e.g., by a photolithography method, an etching method and the like to form the protruded portion 183.

Here, the protruded portion 183 is formed in an area on which the tip portion 181b of the columnar spacer 181 abuts on the TFT array substrate 10 when the TFT array substrate 10 and the counter substrate 20 are made to face each other and are aligned.

The planar shape of the flat edge portion 183a of the protruded portion 183 is formed according to the planar shape of the edge surface of the tip portion 181b of the columnar spacer 181.

The projecting portion 183b of the protruded portion 183 is formed to be contained in the inside of the recessed portion 182.

Next, the counter substrate 20 on which the columnar spacers 181 are formed and to which the liquid crystal LC is applied is faced and aligned with the TFT array substrate 10 on which the protruded portions 183 are formed.

Subsequently, the projecting portion 183b of the protruded portion 183 is contained in the recessed portion 182 of the tip portion 181b of the columnar spacer 181 such that the edge surface of the tip portion 181b abuts on the flat edge portion 183a of the protruded portion 183.

Then, in a vacuum condition, the TFT array substrate 10 and the counter substrate 20 are bonded together by using the sealing material 52, and the TFT array substrate 10 and the counter substrate 20 are electrically connected by using the inter-substrate conductive material 106, and further the adhesive material 184 is cured by heating (substrate bonding step).

Figure 8:
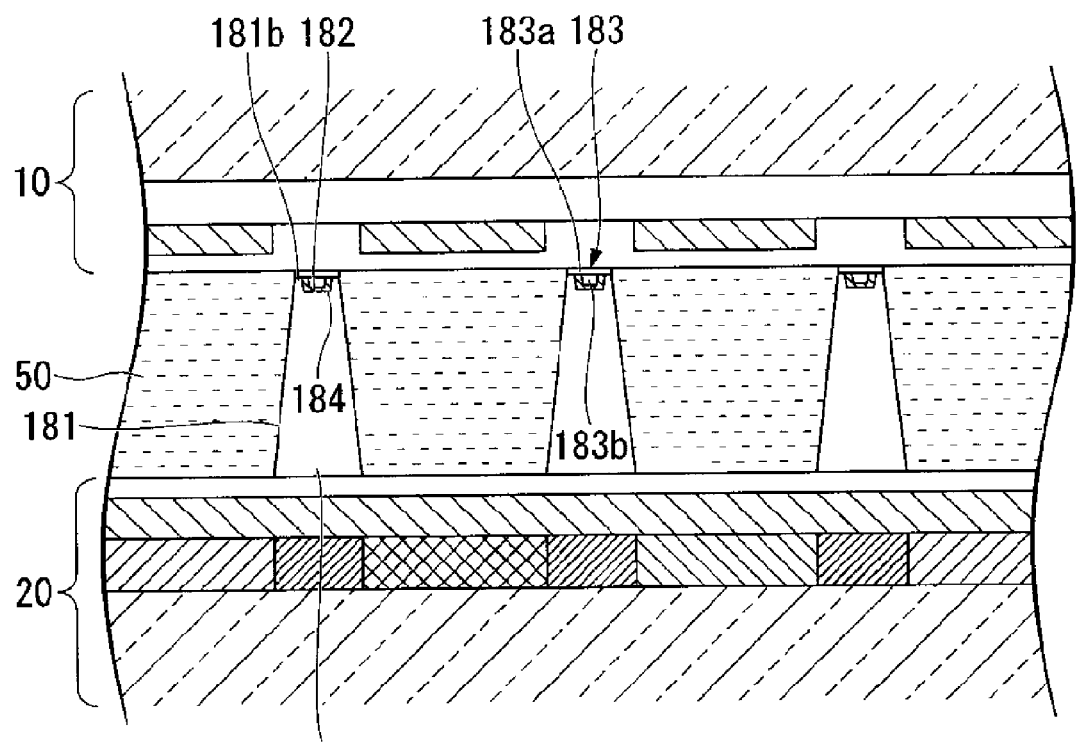
FIG. 8 is a sectional view showing a manufacturing step of the liquid crystal device in the first embodiment of the invention.

In this way, as shown in FIG. 8, the TFT array substrate 10 and the counter substrate 20 are bonded together with the columnar spacer 181 and the protruded portion 183 interposed therebetween, and the tip portion 181b of the columnar spacer 181 is fixed to the protruded portion 183 on the counter substrate 20 by using the adhesive material 184.

The liquid crystal device 100 in which the liquid crystal layer 50 is sandwiched between the TFT array substrate 10 and the counter substrate 20 can thus be manufactured.

As described above, according to the method for manufacturing the liquid crystal device 100 of this embodiment, the base portion 181a of the columnar spacer 181 is formed on the counter substrate 20, and the tip portion 181b is fixed to the TFT array substrate 10 by using the adhesive material 184.

Accordingly, it is possible to manufacture the liquid crystal device 100 in which even if the TFT array substrate 10 and the counter substrate 20 are placed in a state where they stand at right angles to the horizontal direction, stresses to expand the gap between the TFT array substrate 10 and the counter substrate 20 can act on the columnar spacers 181 and adhesive material 184, enabling the cell gap to be maintained uniformly to lead to the improved display quality.

In the liquid crystal application step, the liquid crystal LC is discharged as droplets, and the liquid crystal LC is applied to enclose an adhesive material application region A1 into which the adhesive material 184 is to be applied, thereby forming the liquid crystal non-application region A2 that includes the adhesive material application region A1 and into which droplets of the liquid crystal LC are not applied.

This allows the uncured adhesive material 184 to be prevented from mixing into the liquid crystal LC.

Moreover, when bonding the TFT array substrate 10 and the counter substrate 20 together in the substrate bonding step, forming of the liquid crystal non-application region A2 allows the adhesive material 184 to be cured by heating by the time when the flowing liquid crystal LC reaches the tip portion 181b of the columnar spacer 181.

Accordingly, the uncured adhesive material 184 can be prevented from mixing into the liquid crystal LC.

Second Embodiment

The second embodiment of the invention is next described with reference to FIGS. 9 to 13 as well as FIGS. 1 to 3.

A liquid crystal device 100A of this embodiment differs from the liquid crystal device 100 described in the above first embodiment in that a recessed portion is formed on the TFT array substrate 10 and the edge surface of the tip portion 181b of the columnar spacer 181 is a flat surface.

Other respects of the embodiment are the same as those of the first embodiment, and therefore the same parts as those in the first embodiment are designated by the same reference numerals and the same description is not repeated.

Liquid Crystal Device

Figure 9:
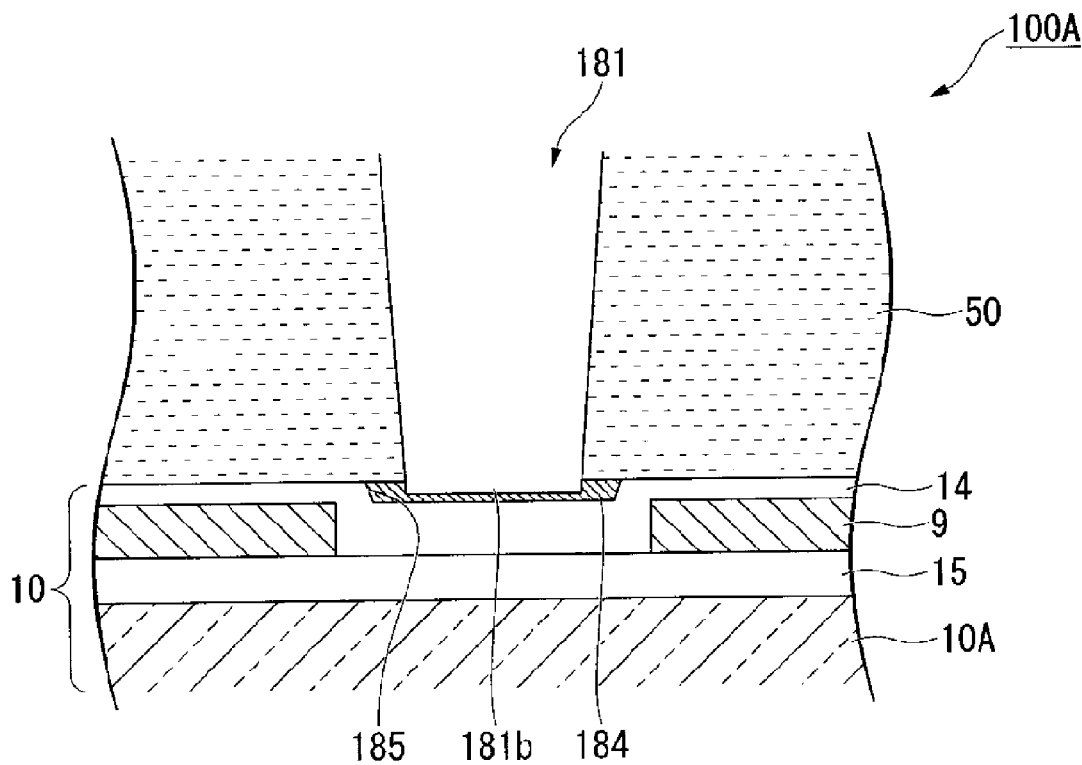
FIG. 9 is a sectional view, corresponding to FIG. 4, of a liquid crystal device in a second embodiment of the invention.

As shown in FIG. 9, in the liquid crystal device 100A of this embodiment, a substrate recessed portion 185 is formed in the TFT array substrate 10.

The inside of the substrate recessed portion 185 is filled with an adhesive material 184.

The tip portion 181b of the columnar spacer 181 is contained in the inside of the substrate recessed portion 185.

The tip portion 181b of the columnar spacer 181 is fixed to the TFT array substrate 10 by using the adhesive material 184 received in the inside of the substrate recessed portion 185.

According to the liquid crystal device 100A of this embodiment, in the same manner as in the first embodiment, the uncured adhesive material 184 is held on the TFT array substrate 10, so that the adhesive material 184 is prevented from flowing to the outside of the substrate recessed portion 185.

This enables the tip portion 181b of the columnar spacer 181 to be securely fixed to the TFT array substrate 10.

This also enables the adhesive material 184 to be prevented from mixing into the liquid crystal layer 50.

Further, this increases the area of bonding of the TFT array substrate 10 to the tip portion 181b of the columnar spacer 181, enabling the bonding strength to be improved.

The tip portion 181b of the columnar spacer 181 can thus be more securely and strongly fixed to the TFT array substrate 10.

Moreover, the tip portion 181b of the columnar spacer 181 is contained in the substrate recessed portion 185.

The amount of the adhesive material 184 to be received in the substrate recessed portion 185 can therefore be decreased.

Thus, consumption of the adhesive material 184 can be reduced, and the adhesive material 184 can be more securely prevented from flowing out from the substrate recessed portion 185.

Method for Manufacturing Liquid Crystal Device

With reference to FIGS. 10 to 13, a method for manufacturing the liquid crystal device 100A of this embodiment is next be described.

Figure 10:
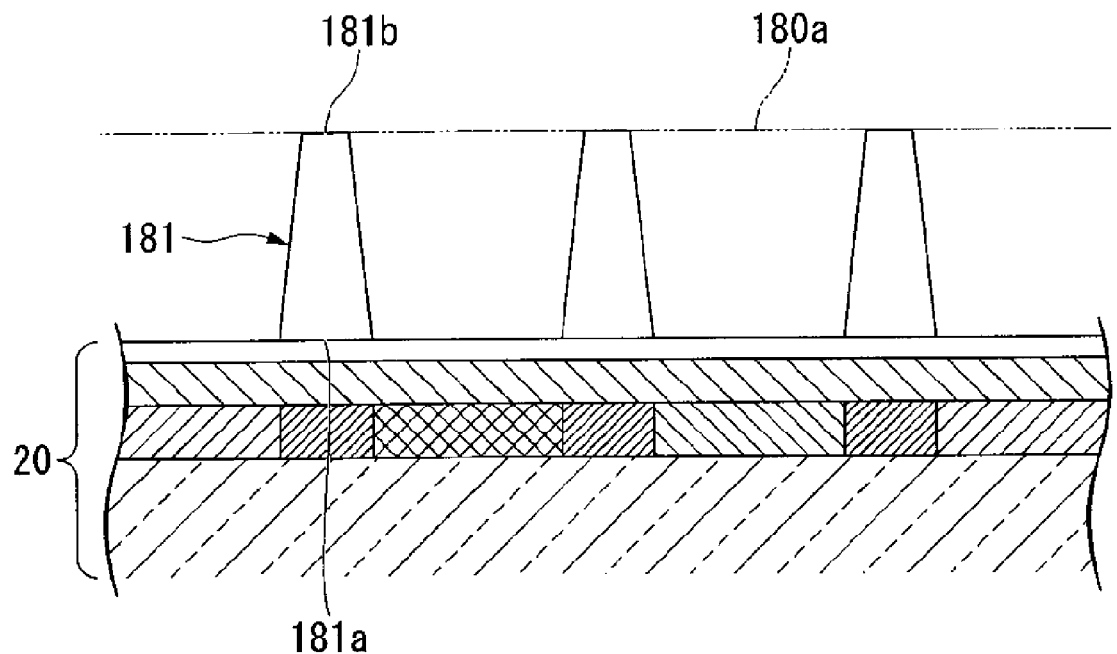
FIG. 10 is a sectional view showing a manufacturing step of the liquid crystal device in the second embodiment of the invention.

As shown in FIG. 10, in the same way as in the first embodiment, the spacer material layer 180a formed on the counter substrate 20 is processed to form the columnar spacers 181 (spacer formation step).

Here, in this embodiment, a recessed portion is not formed in the edge surface of the tip portion 181b of the columnar spacer 181, and therefore the edge surface is a flat surface.

Figure 11:
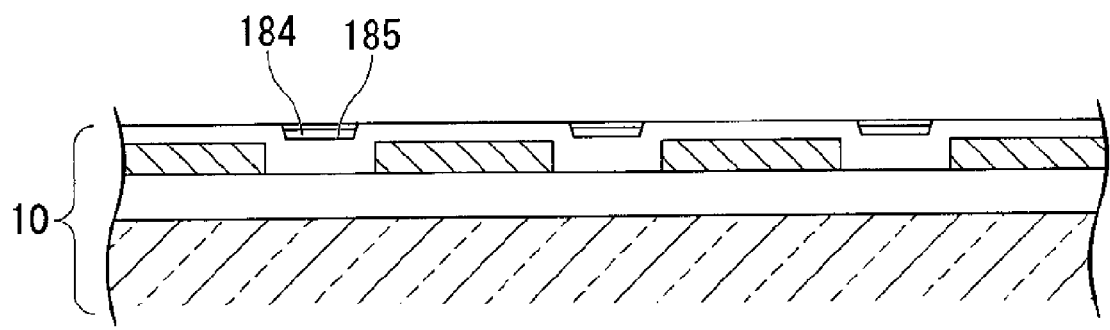
FIG. 11 is a sectional view showing a manufacturing step of the liquid crystal device in the second embodiment of the invention.

As shown in FIG. 11, the substrate recessed portion 185 is formed on a surface of the TFT array substrate 10, e.g., by a photolithography method, an etching method and the like.

Here, the substrate recessed portion 185 is formed so as to include an area on which the tip portion 181b of the columnar spacer 181 abuts on the TFT array substrate 10 when the TFT array substrate 10 and the counter substrate 20 are made to face each other and are aligned and so as to be larger than the edge surface of the tip portion 181b in plan view.

Next, the adhesive material 184 is discharged and applied as droplets to the substrate recessed portion 185, e.g., by an inkjet method, so that the substrate recessed portion 185 receives the adhesive material 184 (adhesive material application step).

At this point, to prevent the adhesive material 184 from flowing to the outside of the substrate recessed portion 185, the discharge amount of the adhesive material 184 is controlled and droplets of the adhesive material 184 are discharged and applied onto the inside of the substrate recessed portion 185 with good precision.

Figure 12:
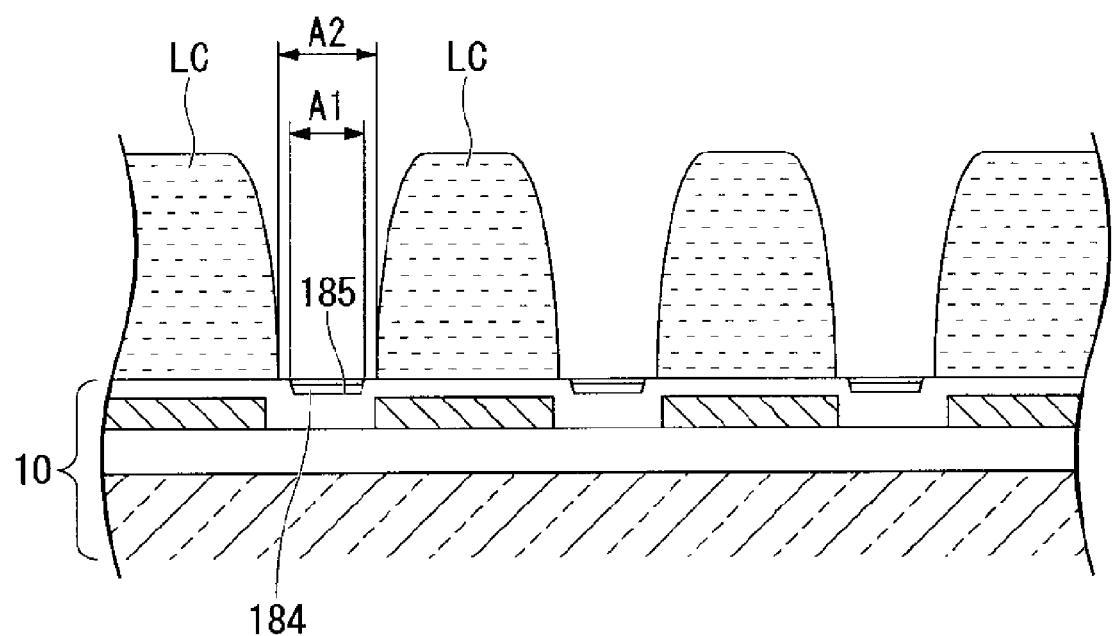
FIG. 12 is a sectional view showing a manufacturing step of the liquid crystal device in the second embodiment of the invention.

Next, after the sealing material 52 (refer to FIG. 1) is applied in a frame shape onto the TFT array substrate 10, the liquid crystal LC is discharged and applied as droplets onto the inside of the sealing material 52, as shown in FIG. 12, e.g., by an inkjet method (liquid crystal application step).

At this point, in the same way as in the first embodiment, the liquid crystal LC is applied to enclose the adhesive material application region A1 into which the adhesive material 184 is to be applied, i.e., a region for forming the substrate recessed portion 185, thereby forming the liquid crystal non-application region A2 that includes the adhesive material application region A1 and into which droplets of the liquid crystal LC are not applied.

The liquid crystal non-application region A2 is formed, e.g., in a circular shape according to the planar shape of the columnar spacer 181.

Next, the TFT array substrate 10 to which the liquid crystal LC is applied is made to face and is aligned with the counter substrate 20 on which the columnar spacers 181 is formed.

Subsequently, the tip portion 181b of the columnar spacer 181 is contained in substrate recessed portion 185.

Then, in a vacuum condition, the TFT array substrate 10 and the counter substrate 20 are bonded together by using the sealing material 52, and the TFT array substrate 10 and the counter substrate 20 are electrically connected by using the inter-substrate conductive material 106, and further the adhesive material 184 is cured by heating (substrate bonding step).

Figure 13:
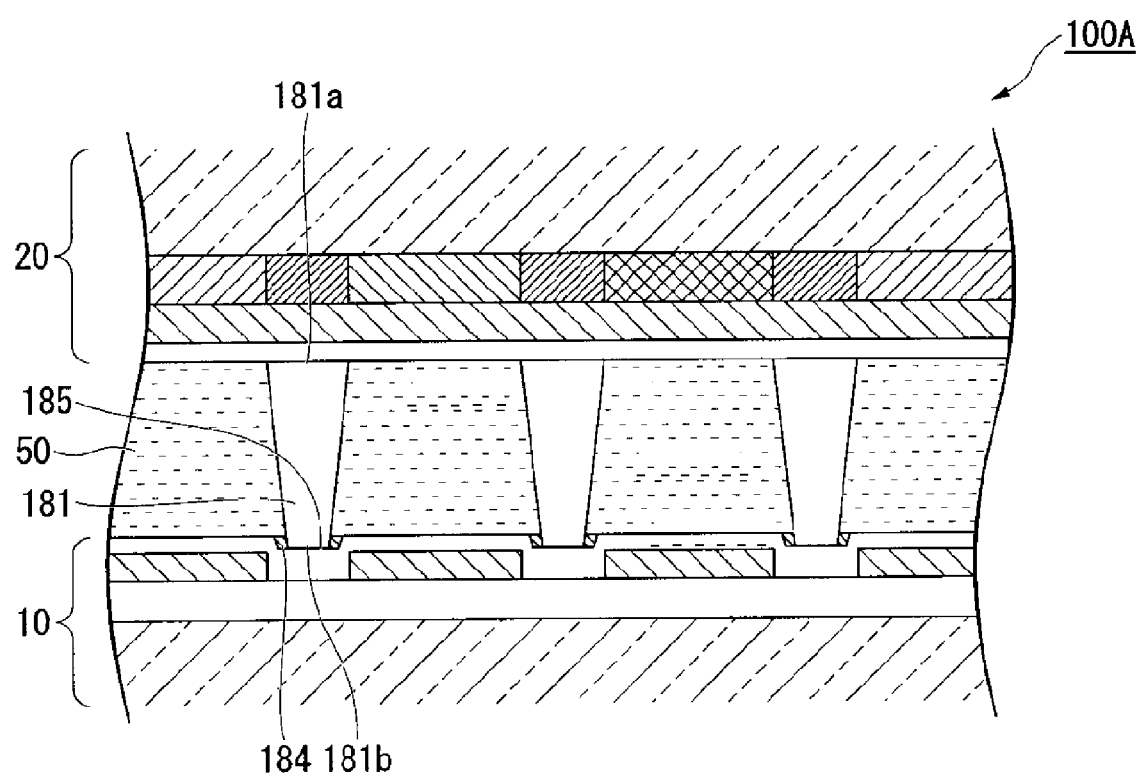
FIG. 13 is a sectional view showing a manufacturing step of the liquid crystal device in the second embodiment of the invention.

In this way, as shown in FIG. 13, the TFT array substrate 10 and the counter substrate 20 are bonded together with the columnar spacers 181 interposed therebetween, and the tip portion 181b of the columnar spacer 181 is fixed to the substrate recessed portion 185 on the counter substrate 20 by using the adhesive material 184.

The liquid crystal device 100 in which the liquid crystal layer 50 is sandwiched between the TFT array substrate 10 and the counter substrate 20 can thus be manufactured.

As described above, according to the method for manufacturing the liquid crystal device 100 of this embodiment, the base portion 181a of the columnar spacer 181 is formed on the counter substrate 20, and the tip portion 181b is fixed to the TFT array substrate 10 by using the adhesive material 184.

Accordingly, the liquid crystal device 100 can be manufactured in which even if the TFT array substrate 10 and the counter substrate 20 are placed in a state where they stand at right angles to the horizontal direction, stresses to expand the gap between the TFT array substrate 10 and the counter substrate 20 can act on the columnar spacers 181 and adhesive material 184.

This enables the cell gap to be maintained uniformly, leading to the improved display quality.

In the same way as in the first embodiment, the liquid crystal LC is applied to enclose the adhesive material application region A1, thereby forming the liquid crystal non-application region A2.

This allows the uncured adhesive material 184 to be prevented from mixing into the liquid crystal LC.

Moreover, in the same way as in the first embodiment, forming of the liquid crystal non-application region A2 allows the adhesive material 184 to be prevented from mixing into the liquid crystal LC.

It should be noted that this invention is not limited to the foregoing embodiments, and various changes and modifications can be made without departing from the spirit of the invention.

Although columnar spacers are formed on the counter substrate and protruded portions or substrate recessed portions are formed in the TFT array substrate in the foregoing embodiments, the columnar spacers may be formed on the TFT array substrate and protruded portions or substrate recessed portions may be formed in the counter substrate.

In the foregoing first embodiment, although part of the protruded portion formed on the TFT array substrate is contained in the recessed portion formed at the tip of the columnar spacer, the entire protruded portion may be contained in the recessed portion.

In this case, the shape of the protruded portion is not specifically limited.

Also, the combination among the protruded portion, the recessed portion and the substrate recessed portion is not limited to the foregoing embodiments.

Further, the protruded portion, the recessed portion and the substrate recessed portion need not be formed.

Also, the substrate recessed portion need not contain the tip portion of the columnar spacer, and may be formed smaller than the tip portion.

Also, the liquid crystal device can be applied to both a passive-matrix method and an active-matrix method.

Regarding a liquid crystal material constituting the liquid crystal layer, liquid crystal materials having dielectric anisotropy can be used as the material regardless of the kind.

Further, a transmission-type liquid crystal device is configured in this embodiment.

However, a reflection-type or transflective-type liquid crystal device may be configured in which a reflective layer made of a metallic film having light reflection properties, such as an aluminum film or a silver film, is provided on the inner surface side of the element substrate.

The entire disclosure of Japanese Patent Application No. 2007-317984, filed Dec. 10, 2007 is expressly incorporated by reference herein.

What is claimed is:

1. A liquid crystal device comprising:
   a first substrate;
   a second substrate;
   a columnar spacer, the first substrate and the second substrate being bonded together with the columnar spacer interposed therebetween;
   a protruding portion formed on the second substrate; and
   liquid crystal sandwiched between the first substrate and the second substrate,
   wherein the columnar spacer has:
      a base portion formed on the first substrate; and
      a tip portion fixed to the second substrate with an adhesive material, the tip portion having a recessed portion for receiving the adhesive material,
   the protruded portion corresponds to the recessed portion, and
   the adhesive material is disposed between the recessed portion and the protruded portion.

2. A method for manufacturing a liquid crystal device having a first substrate, a second substrate, a columnar spacer, the first substrate and the second substrate being bonded together with the columnar spacer interposed therebetween, and liquid crystal sandwiched between the first substrate and the second substrate, the method comprising:
   forming a spacer material layer on the first substrate and processing the spacer material layer to form the columnar spacer, the spacer material being processed to form a columnar spacer having a tip portion distal from the first substrate that includes a recessed portion;
   forming a protruding portion on the second substrate at a position that corresponds to the columnar spacer formed on the first substrate, the protruding portion for engaging the recessed portion of the columnar spacer;
   applying an adhesive material to the recessed portion of the columnar spacer;
   applying the liquid crystal onto one of the first substrate and the second substrate; and
   bonding the first substrate and the second substrate together with the columnar spacer interposed therebetween, and fixing the tip portion of the columnar spacer to the second substrate by using the adhesive material such that the adhesive material is disposed between the recessed portion and the protruding portion.

3. The method for manufacturing a liquid crystal device according to claim 2, wherein, in the step of applying the liquid crystal, the liquid crystal is applied to enclose an adhesive material application region to which the adhesive material is to be applied, thereby forming a liquid crystal non-application region that includes the adhesive material application region and to which the liquid crystal is not applied.

4. The liquid crystal device of claim 1, further comprising an alignment layer formed on the second substrate, the alignment layer including the protruding portion.

5. The liquid crystal device of claim 4, wherein the alignment layer defines a first plane orthogonal to the spacer, a step portion of the alignment layer projects from the plane and defines a second plane orthogonal to the spacer, and the protruding portion extends from the step portion.

6. The method of claim 2, further comprising forming an alignment layer on the second substrate.

7. The method of claim 6, further comprising forming a step portion on the alignment layer, the alignment layer defining a first plane orthogonal to the spacer, the step portion of the alignment layer projects from the plane and defines a second plane orthogonal to the spacer, and the protruding portion extends from the step portion.

\* \* \* \* \*